Oct. 30, 1951 A. W. DERICKS 2,573,315
AGITATOR FOR DRILL HOPPERS
Filed June 14, 1949 2 SHEETS—SHEET 1

Inventor

Arthur W. Dericks

By *Clarence A. O'Brien and Harvey B. Jacobson*
Attorneys

Inventor
Arthur W. Dericks

Patented Oct. 30, 1951

2,573,315

UNITED STATES PATENT OFFICE 2,573,315

AGITATOR FOR DRILL HOPPERS

Arthur W. Dericks, Columbus, Nebr.

Application June 14, 1949, Serial No. 98,910

1 Claim. (Cl. 222—200)

1

This invention relates to new and useful improvements and structural refinements in hopper agitators for seed drills, and the principal object of the invention is to save a considerable amount of time and labor in the performance of the drilling operation by eliminating the necessity of manually agitating the contents of the hopper.

In particular the invention concerns itself with the distribution of broom grass seed and other seeds of a chaffy nature which usually obstruct the outlet openings in the bottom of the hopper and impair the efficiency of the drilling operation.

The object of the invention is carried out by the provision of an oscillatory member in the seed hopper, said member being equipped with a plurality of resiliently flexible agitating rods which extend into the seed outlet openings, so that not only the contents of the hopper are agitated by the oscillatory member itself, but proper passage of the seed through the outlet openings is assured by the action of the resiliently bendable rods.

An important feature of the invention resides in the provision of means for oscillating the agitating member by the rotary motion of a feed regulating shaft which is commonly provided under the hopper.

Some of the advantages of the invention lie in its simplicity of construction, in its efficient and time-saving operation as aforesaid, and in its adaptability for use in drill hoppers of different sizes and types.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
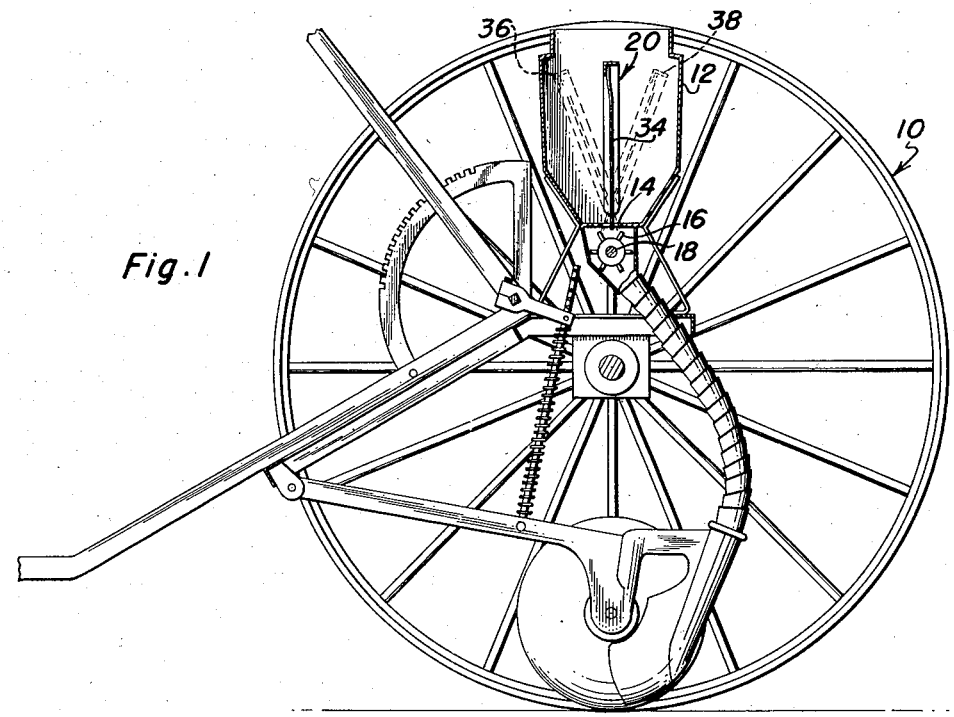
Figure 1 is a cross-sectional view of a drill, including a hopper, and illustrating the invention in situ in the latter.
Figure 3:
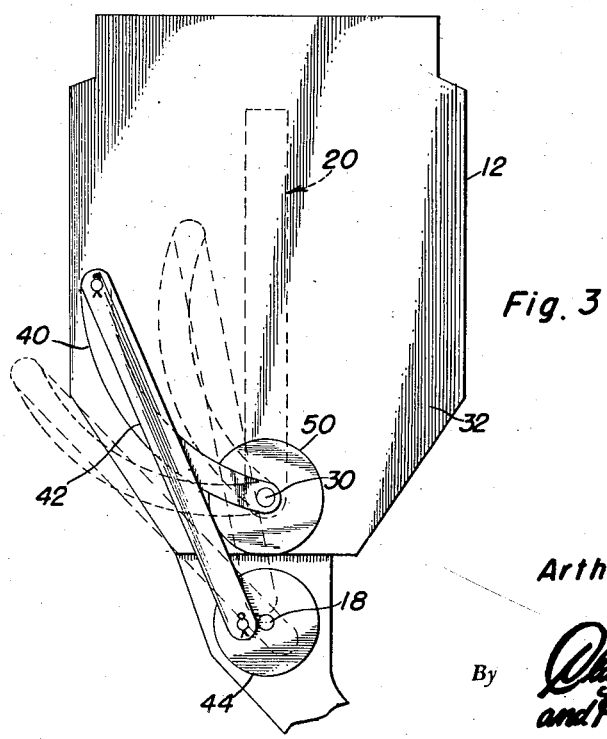
Figure 3 is an end view of the hopper showing the mechanism for oscillating the agitator.

Referring now to the accompanying drawings in detail, the general reference character 10 designates a seed drill including, inter alia, a horizontally elongated hopper 12 having a bottom provided with a row of seed outlet openings 14, as will be clearly apparent.

A feed regulating mechanism 16 is provided under the hopper 12 and is actuated by a rotatable shaft 18 which extends longitudinally of the hopper, and the invention resides in the provision of an agitator designated generally by the reference character 20, which will now be described.

Figure 2:
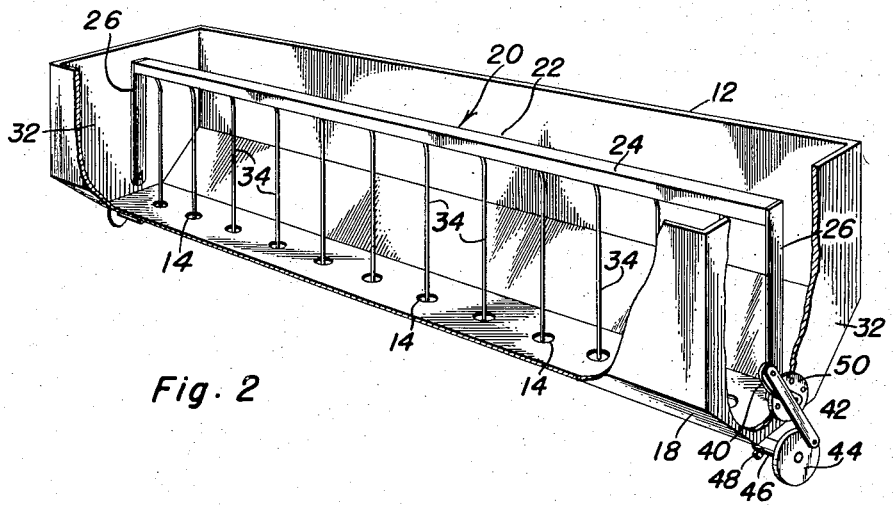
Figure 2 is a perspective view of the hopper per se, the same being partially broken away so as to reveal the invention therein.
Figure 4:
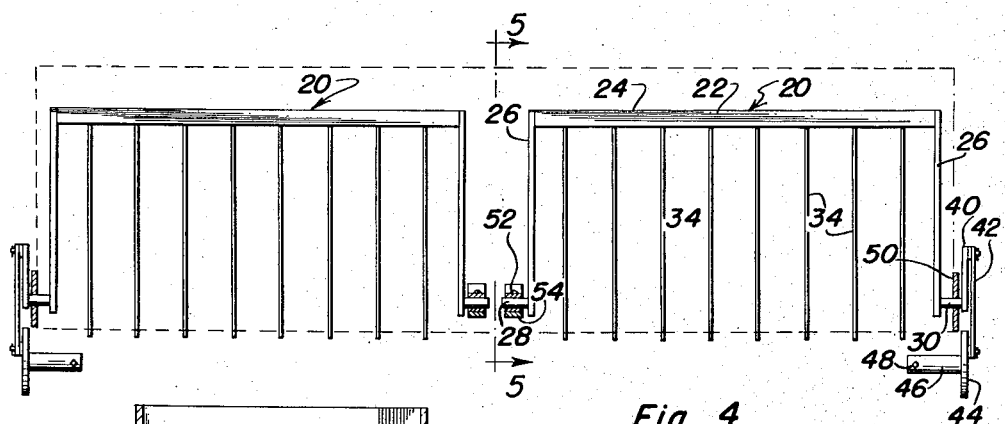
Figure 4 is an elevational view of the invention per se, the same being shown in duplicate for use in twin hoppers or in exceptionally long hoppers.

The agitator 20 embodies in its construction an inverted, substantially U-shaped member 22 which is positioned longitudinally in the hopper 12 and consists of a horizontal intermediate portion 24 and a pair of downturned side portions 26, as is best shown in Figures 2 and 4.

The side portions 26 of the member 22 are provided at their lower extremities with axially aligned trunnions 28, 30 these trunnions being rotatably journaled in the ends 32 of the hopper 12, substantially as shown.

A row of resiliently flexible agitating rods or wires 34 are secured to the intermediate portion 24 of the member 22 and extend downwardly therefrom, the lower end portion of each rod projecting into one of the aforementioned outlet openings 14, as shown in Figure 2.

The agitating member 22 is adapted, by virtue of the trunnions 28, 30, for forward and backward oscillatory movement in the hopper 12, which action will not only agitate the contents of the hopper, but will also produce a flexing action of the rods 34 to assure free passage of the seed through the openings 14. Needless to say, the rods 34 are substantially smaller in diameter than the opening 14, but oscillatory movement of the member 22 as indicated at 36, 38 in Figure 1 will cause the rods 34 to bend alternately in a forward and a rearward direction, as will be clearly understood.

Means are provided for oscillating the agitator member 22, these means consisting of a crank 40 which is secured to the aforementioned trunnion 30 exteriorly of the hopper 12 and is operatively connected by means of a pitman arm 42 to a driving element 44. This element preferably assumes the form of a disk which has the arm 42 connected eccentrically thereto, and which is provided with a tubular boss 46 and with a set screw 48 whereby it may be mounted on an end portion of the aforementioned shaft 18. It is to be noted in this connection that the set screw 48 facilitates longitudinal adjustment of the element 44 on the shaft 18.

Figure 5:
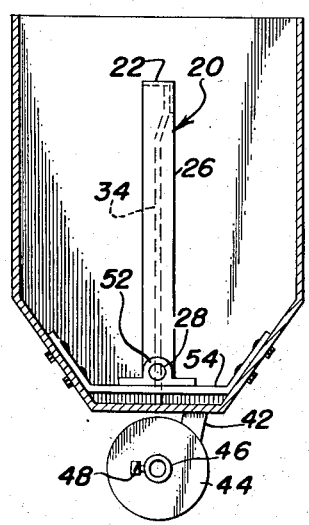
Figure 5 is a cross-sectional view of a hopper featuring an end view of the invention such as may be seen by looking in the direction of the arrows 5—5 in Figure 4.

In instances where the hopper 12 is relatively short and only one agitator is provided therein, the trunnions 28, 30 may be rotatably mounted in suitable bearings 50 provided in the end walls 32 of the hopper. However, in instances where twin hoppers are employed, or where a single hopper is of considerable length, a pair of agitators may be used, as indicated in Figures 4 and 5. In such instances the outer trunnions 30 of the agitators may be rotatably mounted in the end walls of the hopper or hoppers as aforesaid, and the drive to the respective agitators may be transmitted by separate cranks, pitman arms and driving elements at the outer ends of the feed regulating shaft or shafts, as has been already described. However, the inner trunnions 28 of the agitator may be mounted in suitable bearings 52 supported by transverse brackets 54 provided intermediate the ends of the hopper or hoppers, as will be clearly apparent.

It is believed that the advantages and use of the invention will be readily understood from the foregoing disclosure and, accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

An agitator structure for seed drill hoppers having a bottom provided with a row of seed outlet openings, and a rotatable drive shaft extending longitudinally under said bottom, said agitator structure comprising an inverted substantially U-shaped member adapted to be positioned longitudinally in a hopper and affording a horizontal intermediate portion and a pair of downturned side portions, axially aligned trunnions provided at the lower ends of said side portions and rotatably journaled in opposite ends of the hopper whereby said member is adapted for forward and backward oscillatory movement, a row of resiliently flexible agitating rods secured to said intermediate portion and extending downwardly therefrom into the respective hopper openings, an actuating crank secured to one of said trunnions, a driving element adapted to be secured to the drive shaft, and a pitman arm operatively connecting said element to said crank whereby oscillatory movement may be imparted to said member.

ARTHUR W. DERICKS.

REFERENCES CITED

The following references are of record in the file of this patent:

UNITED STATES PATENTS

| Number | Name | Date |
| --- | --- | --- |
| 620,191 | Sobey | Feb. 28, 1899 |
| 1,323,401 | McCaskie | Dec. 2, 1919 |
| 2,078,098 | Roberts | Apr. 20, 1937 |